US006785511B1

(12) United States Patent
Hengeveld et al.

(10) Patent No.: US 6,785,511 B1
(45) Date of Patent: Aug. 31, 2004

(54) WIRELESS VEHICULAR REPEATER SYSTEM

(75) Inventors: Thomas A. Hengeveld, Hollis, NH (US); Robert A. Davis, Wayland, MA (US); David A. Brownhill, Westford, MA (US); Timothy J. Allen, Mount Vernon, NH (US)

(73) Assignee: Tyco Electronics Corporation, Middletown, PA (US)

( * ) Notice: Subject to any disclaimer, the term of this patent is extended or adjusted under 35 U.S.C. 154(b) by 407 days.

(21) Appl. No.: 09/696,930

(22) Filed: Oct. 25, 2000

(51) Int. Cl.⁷ ............................................. H04B 7/14
(52) U.S. Cl. ..................... 455/16; 455/450; 455/464
(58) Field of Search ........................ 455/16, 422, 432, 455/434, 440, 444, 446, 450, 464, 432.2

(56) References Cited

U.S. PATENT DOCUMENTS

| | | | | |
|---|---|---|---|---|
| 4,134,069 A | * | 1/1979 | Shiki ............................ | 455/16 |
| 4,539,706 A | * | 9/1985 | Mears et al. ................ | 455/11.1 |
| 5,152,002 A | * | 9/1992 | Leslie et al. ............. | 455/422.1 |
| 5,179,720 A | * | 1/1993 | Grube et al. ................ | 455/16 |
| 5,408,679 A | * | 4/1995 | Masuda ...................... | 455/11.1 |
| 5,509,028 A | * | 4/1996 | Marque-Pucheu .......... | 375/211 |
| 5,613,204 A | * | 3/1997 | Haberman et al. .......... | 455/432 |
| 5,774,789 A | * | 6/1998 | van der Kaay et al. ....... | 455/16 |
| 5,857,144 A | * | 1/1999 | Mangum et al. ........... | 455/11.1 |
| 5,907,794 A | * | 5/1999 | Lehmusto et al. .......... | 455/11.1 |
| 5,915,208 A | * | 6/1999 | Collyer ...................... | 455/11.1 |
| 6,141,533 A | * | 10/2000 | Wilson et al. .............. | 455/11.1 |
| 6,370,377 B1 | * | 4/2002 | Take et al. ................ | 455/432.1 |
| 6,370,384 B1 | * | 4/2002 | Komara ...................... | 455/447 |
| 6,404,775 B1 | * | 6/2002 | Leslie et al. ................ | 370/466 |
| 6,459,881 B1 | * | 10/2002 | Hoder et al. ............... | 455/11.1 |

FOREIGN PATENT DOCUMENTS

| | | | |
|---|---|---|---|
| DE | 195 35 021 A1 | 7/1997 | ............ H04B/7/26 |
| WO | WO 98/05172 | 2/1998 | ............ H04Q/7/04 |
| WO | WO98-05172 | * 2/1998 | ............ H04Q/7/04 |
| WO | WO 98/35421 | 6/1998 | ............ H04Q/7/20 |

OTHER PUBLICATIONS

Radio Resource Magazine—Public Safety Report—Apr. 1999, Communications Solutions for Public Safety: Navigating Uncharted Waters: 800 MHz, pp. 63–68.
Patent Abstracts of Japan, Publication No. 61169032, Publication Date Jul. 30, 1986, Application Date Jan. 22, 1985, Application No. 60009635.

* cited by examiner

Primary Examiner—William Trost
Assistant Examiner—Stephen D'Agosta

(57) ABSTRACT

A wireless communications system has a plurality of base stations, a plurality of mobile vehicular repeater units, and a plurality of portable units. In a typical context, each mobile vehicular repeater unit is associated with at least one portable unit, and both may be associated with a single user. The object is for the user(s) to be able to access the wireless network for any geographic location. In cases where a geographic area is shadowed from a base station and communication directly between the portable unit and the base station is not possible, it is beneficial to use the mobile vehicular repeater unit in accordance with an extended coverage mode of operation, to relay communications between the portable unit and the base station. A mobile vehicular repeater unit constructed according to the present invention enters the extended coverage mode of operation in response to receipt of an access request, transmitted by a first of the plurality of portable units. Responsive to that request, a mobile vehicular repeater unit transmits to the portable unit a signal representative of an identification of the upper and lower frequency channel portions.

4 Claims, 6 Drawing Sheets

WIRELESS VEHICULAR REPEATER SYSTEM

BACKGROUND OF THE INVENTION

1. Field of the Invention

The present invention relates to wireless communication systems and, more particularly, to a method and apparatus for improving the performance of such systems and the portable units cooperating therewith.

2. Discussion of the Background Art

Wireless communication systems conventionally comprise one or more base stations, a plurality of mobile units, and a plurality of portable units. The term "mobile unit" should be understood as referring to a communication device located within a vehicle and powered by a battery located in the vehicle, while a "portable unit" is intended to refer to a communication device carried by a person and powered by a smaller portable battery (typically unitary with the communication device). A typical mobile unit is operative to transmit RF communication signals at a power level on the order of about 20 Watts, while a typical portable unit is operative to transmit such signals at a power level of about 3 Watts.

Wireless communication systems operate with each base station being fixed at a single geographic location and configured to transmit high powered RF energy from an antenna mounted at a significant height above ground level. Similarly, each base station receives RF energy at an antenna mounted at a similar significant height above ground level. A base station communicates with one or more portable units that are geographically positioned within some radius defined by minimum power level necessary to successfully receive an RF signal transmitted to and from the base station. Communication between a base station and a central office is established over a land based cable network or, alternatively, by a microwave point to point link using a frequency range different from that used for communication between a base station and the mobile units. To allow a plurality of base stations to inter-operate as a single wireless system, the central office performs various switching and routing functions.

Portable units are typically hand held by the wireless system user and operate to communicate with one of the base stations to provide connectivity to the larger wireless system. Ideally, a user with one of the portable units is able to maintain communication anywhere within a defined geographic region. While an indicator of the quality of a wireless communication system is the percentage of coverage available within a given geographic area, it is a practical reality that natural and artificial topographies create communication "shadows" where communication between a portable unit and a base station will degrade or cease altogether. A mobile unit, however, may still be within the coverage area supported by the base station as a result of its higher powered RF transmission capacity. The size and number of the shadows reduce the percentage of portable coverage within a given geographic area.

One possible solution to the shadow problem is to erect one or more additional base stations that are operable to transmit and receive within a respective shadowed area. As with any increase in infrastructure, however, an election to include additional base stations would significantly increase the overall system cost Moreover, the shadowed areas may be used only on an infrequent basis such that the cost and maintenance of additional base stations would not be warranted. An alternate solution to the shadow problem requiring a substantially lower capital investment is to add a component to the overall wireless system called a mobile vehicular repeater unit. The mobile vehicular repeater unit operates as a movable base station that is, for example, permanently mounted in a vehicle driven by one or more portable unit users. The mobile vehicular repeater unit acts as an intermediary between the portable unit and the base station to relay information received from the portable unit to the base station and vice versa. The mobile vehicular repeater unit, in practical effect therefore, becomes a "roaming base station" by receiving communications from the base station and further transmitting those communications to one or more portable units.

Each radio channel employed in a wireless transmissions system having mobile repeater units and portable units typically consists of two frequencies which are separated by a fixed frequency offset. In such instances the Federal Communications Commission ("FCC") has defined the forward channel portion, i.e. base station transmission to the portable unit/mobile unit, as operating at the higher frequency of the pair. The FCC has further defined the reverse channel portion, i.e. base station reception from the portable unit/mobile unit, as operating at the lower frequency of the pair. A disadvantage arises, however, in that the channels assigned to a given mobile vehicular repeater unit and associated portable units may change from region to region. While the vehicular repeater may, for example, incorporate a global positioning system (GPS) and/or communicate with a centralized or regional facility to learn which channels to use, portable subscriber units are not likely to be equipped with GPS and may also be unable to communicate with the ROC to learn which channels to use. Accordingly, there exists a need to reliably provide the portable units with frequency channel information.

SUMMARY OF THE INVENTION

The aforementioned need is addressed, and an advance is made in the art, by a communication system comprising a base station, a mobile vehicular repeater unit, and one or more portable units in which the mobile vehicular repeater unit is operable to relay frequency channel assignment information to the portable units in response to a wake-up request transmitted by a first of the one or more portable units.

Where the portable unit has coverage between at least one of the base stations and the vehicular repeater over an assigned frequency, the base station transmits to the mobile vehicular repeater unit over a first or forward frequency channel portion, while the mobile vehicular repeater unit transmits to the base station over a second or reverse frequency channel portion. During such operation, an assigned frequency channel portion is used for transmission from either of the mobile vehicular repeater unit and the portable unit to the other.

In the event a portable unit enters an area in which the currently assigned transmit and receive frequency no longer provides coverage to the base station, that portable unit is operable to transmit a channel access request to any nearby mobile vehicular repeater unit—a responding repeater unit being operative to obtain a new operating frequency from, for example, a centralized facility, and to transmit a signal representative of the newly assigned frequency channel to the portable unit. The portable unit is operative to acknowledge receipt of the updated information via the newly assigned frequency channel, whereupon both the mobile vehicular repeater unit and the portable unit begin transmitting using the newly assigned frequency channel.

A method for communicating in accordance with the present invention comprises the steps of a portable unit following a frequency use plan of transmitting to and receiving signals from a mobile vehicular repeater unit or a base station on a respective assigned frequency channel portion. The process further comprises attempting to establish communication between the portable unit and a base station during or after a change in geographic location. If the attempt to establish communication between the portable unit and a base station fails, the portable unit synchronizes to a known beacon frequency over which each mobile vehicular repeater unit periodically announces its availability. Over a reverse channel portion of the beacon frequency, the portable unit transmits a request for the vehicular repeater to identify an appropriate frequency pair over which they may exchange RF transmission signals and thereby provide the portable unit with connectivity to the base station. In accordance with another aspect of the inventive process, the mobile vehicular repeater unit responds by obtaining and providing the frequency pair identification to the first requesting portable unit and, thereafter, it periodically transmits blocks of bits representative of the frequency channel identification for use by any subsequent portable units synchronizing to the beacon frequency that may be used by the mobile vehicular repeater unit and portable unit and so as to restore or provide connectivity to the base station via the mobile vehicular repeater or indirect in accordance with an extended coverage mode of operation.

BRIEF DESCRIPTION OF THE DRAWINGS

The various novel features and aspects of the present invention will be better understood upon reference to the detailed description which follows taken in conjunction with the drawings, in which.

DETAILED DESCRIPTION

Figure 1:
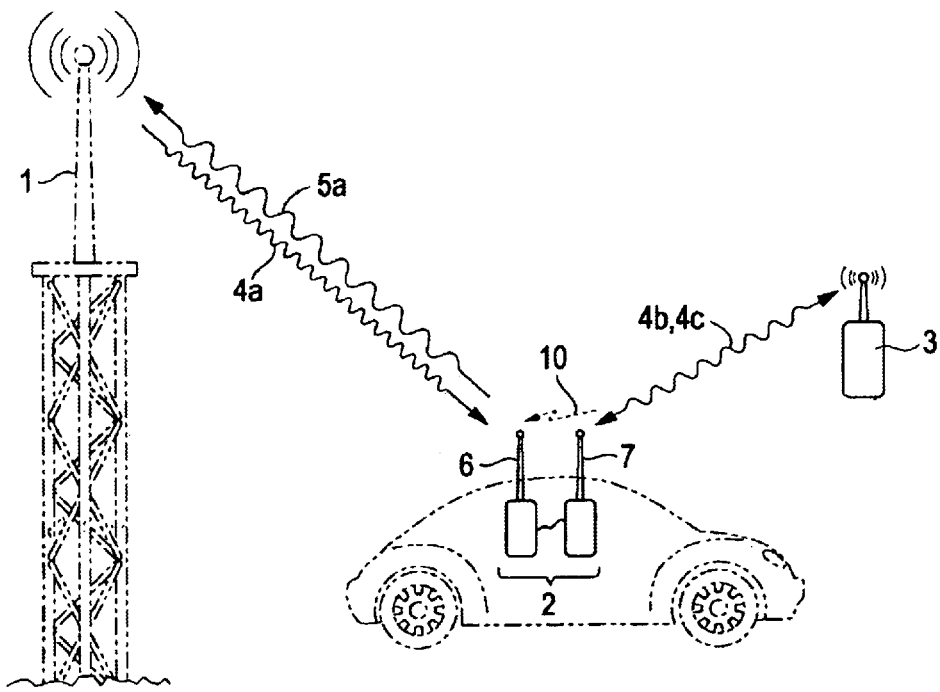
FIG. 1 depicts a prior art system in which mobile vehicular repeater units and portable units communicate with one another and a base station in accordance with a conventionally prescribed frequency plan.

With specific reference to FIG. 1, there is shown an illustrative diagram of a mobile vehicular repeater unit 2 used as a vehicular repeater according to convention in which the mobile vehicular repeater unit 2 receives a signal over a forward channel portion 4a from a base station 1. The mobile vehicular repeater unit 2 further transmits a relayed signal over a repeated forward channel portion 4b to a portable unit 3. Return communication from the portable unit 3 to the mobile vehicular repeater unit occurs over a return channel portion 4c. The return channel portion 4c is transmitted at the same frequency as the forward channel portion 4b at a time different from the forward channel portion 4b transmission from mobile vehicular repeater unit 2 to the portable unit 3. The mobile 2 and the portable 3 communicate in simplex mode. The mobile vehicular repeater unit 2 receives the signal and transmits a relayed signal over a repeated reverse channel 5a for reception by the base station 1. By convention, the channel portions 4a, 4b and 4c operate at one frequency band and the reverse channel portion 5a operates within a different frequency band. The channel portion 4a is spaced apart from the reverse channel portion 5a a fixed amount along the spectral frequency range, i.e. 45 MHz in the present system.

A disadvantage of the conventional approach depicted in FIG. 1 is that a VRU communication antenna 6 receiving the initial forward channel portion 4a signal is co-located with a portable communication antenna 7 transmitting the repeated forward channel 4b signal. At the location of the mobile vehicular repeater unit's base communication antenna 6, the received power of the repeated forward channel signal 4b (shown as reference numeral 10) significantly exceeds that of received power of the initial forward channel 4a signal received from the base station 1. The base communication receiver 6 on the mobile vehicular repeater unit 2 is desirably high gain with a wide dynamic range so that it is able to receive both low and high powered signals from the base station 1. When it is advantageous and appropriate to use the mobile unit 2 as a vehicular repeater, it is also the case that the portable unit 3 has insufficient sensitivity to properly resolve a signal from the base station 1. Therefore, the reception power of the initial forward channel 4a signal is quite low. The transmission antenna 7, however, transmits a relatively high powered signal (approximately 3 Watts) for proper reception by the portable unit 3. The base communication receiver 6 has difficulty properly resolving the low powered forward channel portion 4a from the interference 10 as a result of the relatively higher powered repeated forward channel portion 4b.

Figure 2:
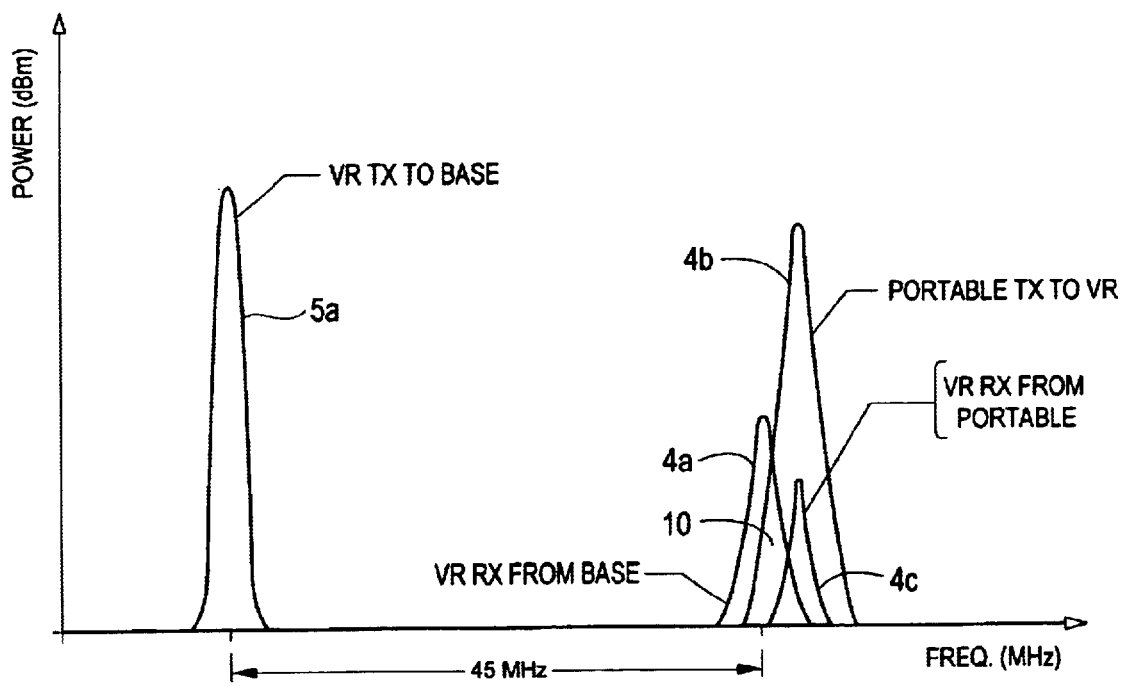
FIG. 2 is a graphical representation of a spectral measurement of the frequency channel of interest positioned at the mobile vehicular repeater unit for the conventional system of FIG. 1, in this case VRU/VTR communication is via simplex operation with one frequency.

With specific reference to FIG. 2 of the drawings, the base communication receiver 6 is unable to resolve two in-band signals (for example 4a and 4b) with significantly different power levels (for example −90 dBm and +5 dBm). It is also noted that the base communication receiver 6 is able to properly resolve two in-band signals with power levels in a similar order of magnitude (for example −90 dBm). FIG. 2 of the drawings illustrates the difficulty with resolving a small in band signal in the presence of a higher power in band signal. As one of ordinary skill in the art can appreciate, the repeated forward channel portion 4b appears as high powered in-band interference to the base communication receiver 6 which interferes with proper reception of the initial forward channel portion 4a signal.

According to one aspect of the present invention, a wireless communication system is proposed wherein the frequency plan of the mobile vehicular repeater unit 2, when used as a vehicular repeater, does not follow convention. Specifically, it is proposed that when the mobile vehicular repeater unit 2 is used as a vehicular repeater, it transmits to the portable unit 3 using the lower frequency band 5 and receives from the portable unit 3 using the upper frequency band 4. As an example, a base station 1 transmits a signal over an initial forward channel portion 4a in the upper frequency band 4 having a center frequency of, for example, 855 MHz. The base station 1 receives a signal over a reverse channel portion 5a in the lower frequency band 5 having a center frequency of, for example, 810 MHz. With specific reference to FIGS. 3 & 4 of the drawings, there is shown an illustrative diagram showing the mobile vehicular repeater unit 2 used as a vehicular repeater and illustrating the change in frequency convention. The mobile vehicular repeater unit 2 is interposed between the base station 1 and the portable unit 3 to relay incoming signals between the two units.

Advantageously, according to the present invention, both the reception and transmission receivers 6, 7 receive in band signals having relatively similar low power levels. The base communication antenna 6 or 7, therefore, is able to properly resolve both signals. The two in-band signals 4a and 4b can be resolved through inexpensive filtering plans. This change in frequency convention improves the stated problem because the high transmission power of the repeated forward channel signal 5b is separated in frequency from the low receive power initial forward channel portion signal 4a. As one of ordinary skill in the art will appreciate, the change in frequency plan convention also permits duplex communication between the mobile 2 and the portable 3. With specific reference to FIG. 4 of the drawings, there is shown a graph of received power at the mobile unit 2 as a function of frequency illustrating the relative ease of resolving the two signals even though the relative power levels are different. Additionally, when a mobile vehicular repeater unit 2 is not interposed between the portable unit 3 and the base station 1, the frequency plan operates according to convention.

Figure 5:
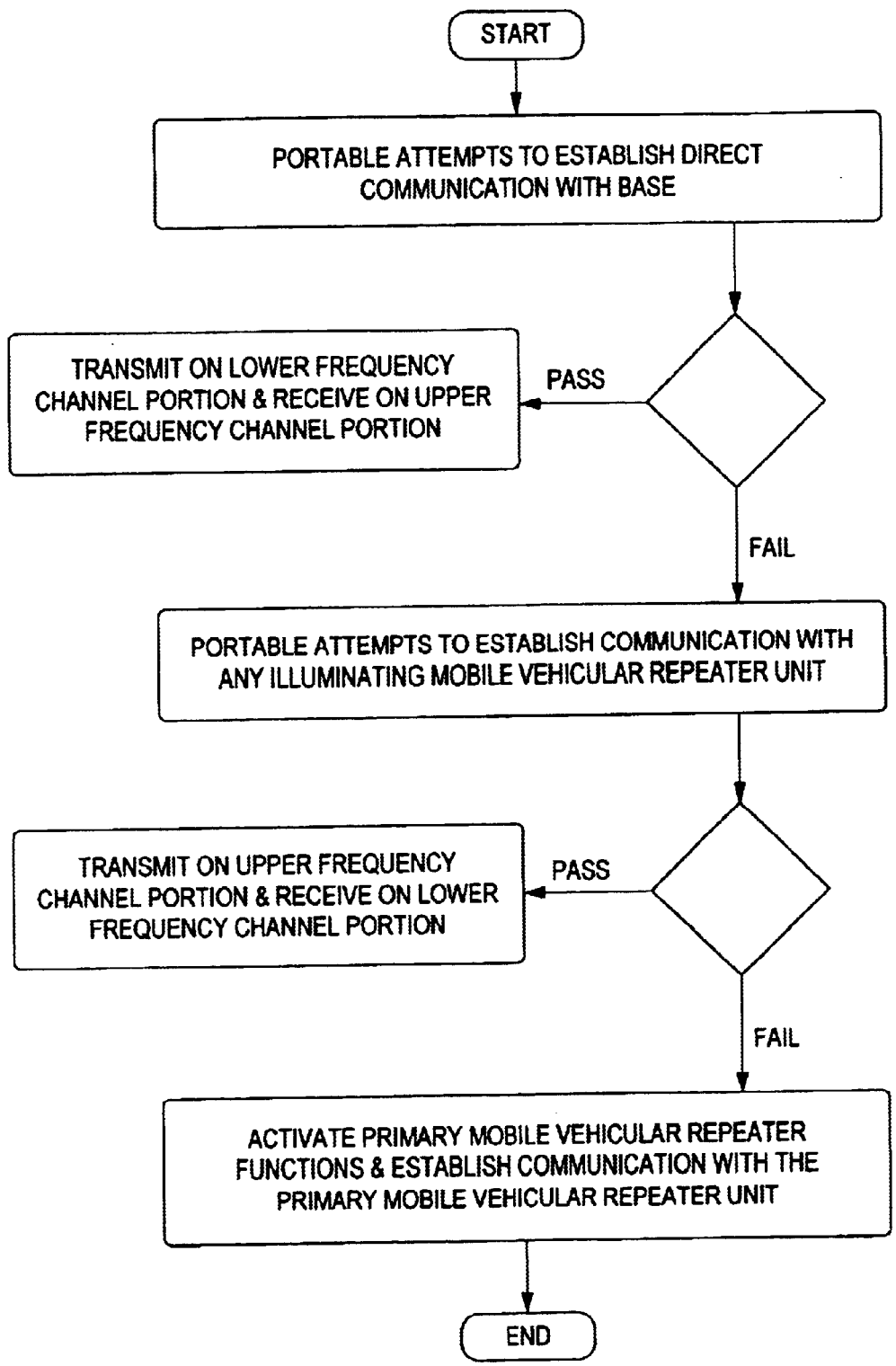
FIG. 5 is a functional block diagram schematic depicting a mobile vehicular repeater unit constructed in accordance with an illustrative embodiment of the present invention.

Turning to FIG. 5, it will be seen that a mobile vehicular repeater unit 2 constructed in accordance with an illustrative embodiment of the present invention essentially comprises two mobile radio units 20, 22 connected via a digital serial interface indicated generally at 24. Mobile radio unit 20 is designated as the vehicular repeater mobile (VRM) which is configured for a mobile radio frequency plan and is operative to establish a communication path with a base station, as base station 1 of FIG. 3, over a network RF channel. The VRM 20 is functionally equivalent to a mobile radio and performs all the functions of a first or mobile radio mode of operation. Mobile radio unit 22 is designated as the vehicular repeater base (VRB) and is configured for a base station frequency plan and communicates with one or more portable units, as portable units 3 and/or 9 of FIG. 3, over a local RF channel. The VRM 20 and VRB 22 communicate over a communication port.

Figure 6:
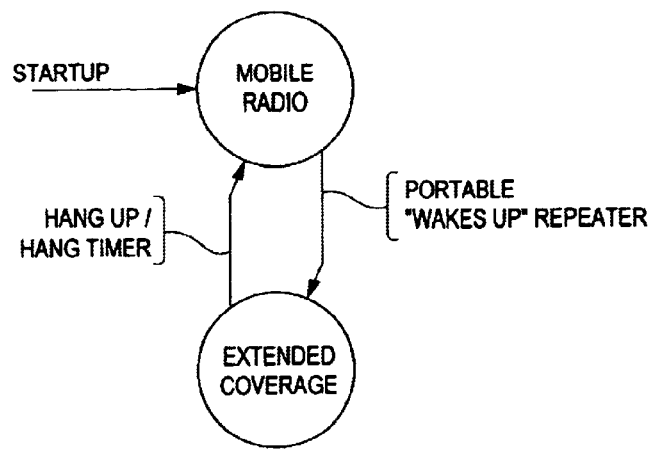
FIG. 6 is a functional block diagram depicting operability of a mobile vehicular repeater unit in one of two distinct modes of operation—a mobile radio mode and an extended coverage mode.

In addition to the aforementioned first or mobile radio mode, mobile vehicular repeater unit 2 is operable in a second or extended coverage mode. In accordance with an illustrative embodiment of the present invention, and as best seen in FIG. 6, the mobile radio mode of operation is the default while the operator has the option of manually selecting the extended coverage mode. It should be noted that although this capability to transition to extended coverage mode is manually enabled, the mobile vehicular unit remains in mobile radio mode until awakened by a portable unit. The transition to extended coverage mode is then automatic when the portable unit "wakes up" the mobile vehicular unit.

Figure 3:
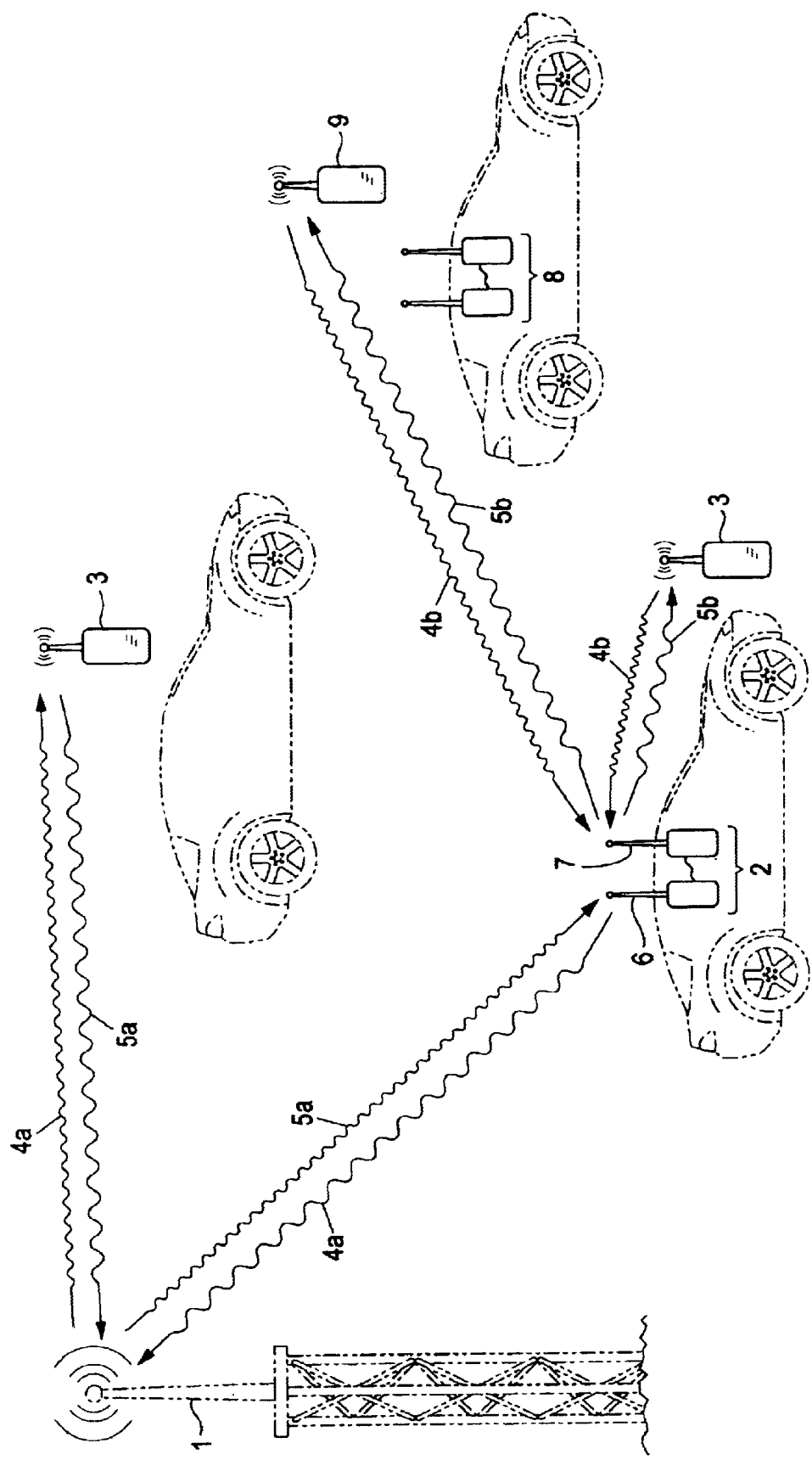
FIG. 3 is a diagram of system constructed in accordance with an illustrative embodiment of the present invention, in which mobile vehicular repeater units and portable units are deployed according to a novel frequency plan.
Figure 4:
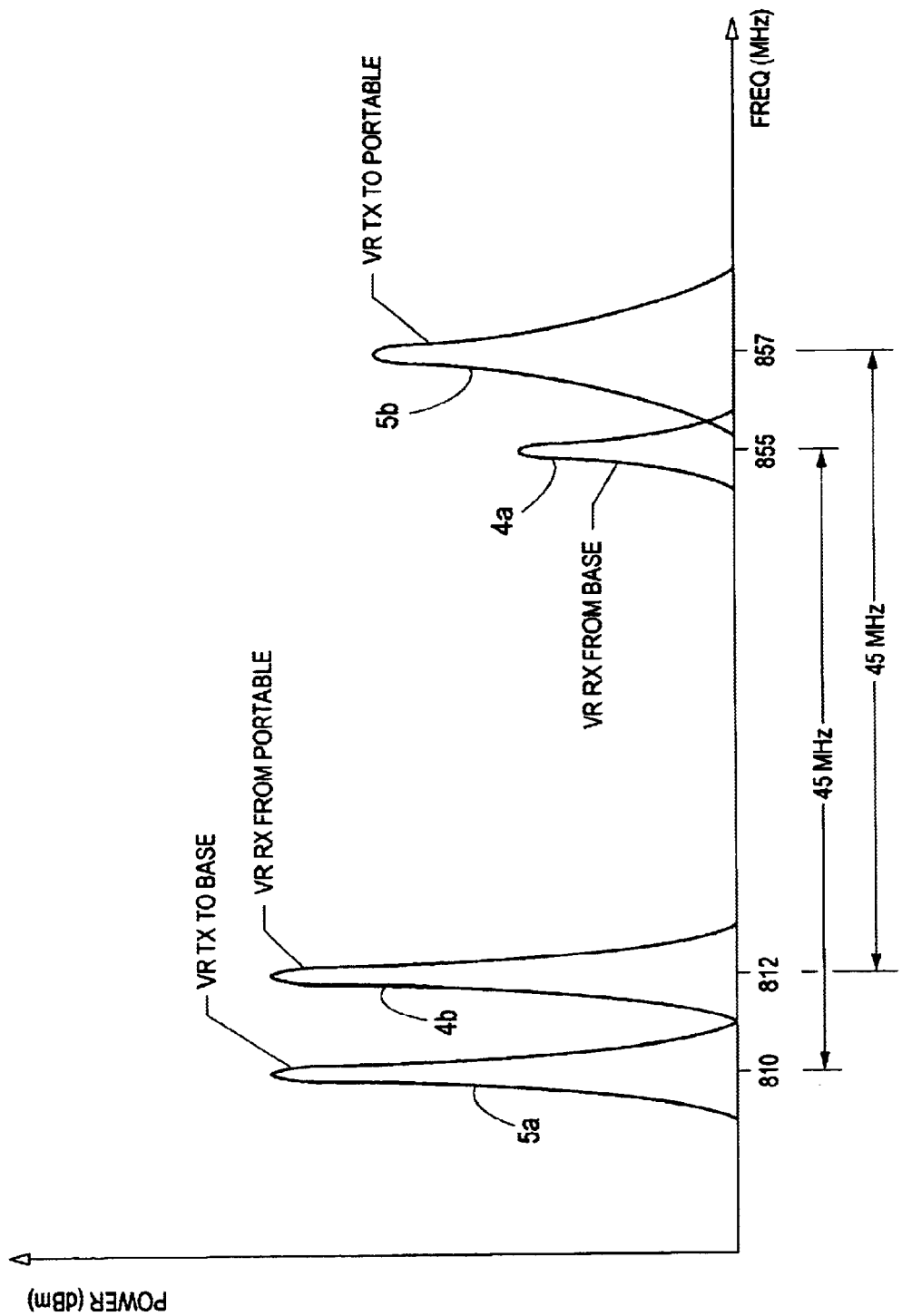
FIG. 4 is a graphical representation of a spectral measurement of the frequency channel of interest positioned at the mobile vehicular repeater unit for the illustrative system of FIG. 3.

As the name implies, in the extended coverage mode a mobile vehicular repeater unit, as unit 2, provides portable units, as units 3 and 9, with access to an associated communication network. By way of illustrative example, and with particular reference to FIG. 3, a police officer who is expected to check out a building might rely upon portable unit 3 for communication with a centralized dispatcher (not shown). Prior to exiting the police car, portable unit 3 would most likely have an unobstructed communication path with the base station and, thus, be able to communicate with the dispatcher over a network RF channel. Upon entering the building, however, obstructions might cause portable unit 3 to lose connectivity with the base station. In accordance with a novel aspect of the present invention, which will be described in greater detail shortly, a mobile vehicular repeater unit, as unit 2 of FIG. 3, is configured when in the extended coverage mode to "wakeup" and establish connectivity with a requesting portable unit over an appropriate set of frequency channels in just such a situation.

From the foregoing, it will now be appreciated that there are two different possible scenarios in the extended coverage mode that dictate the appropriate behavior of the portable and mobile vehicular repeater units 2, 3. For purposes of nomenclature, reference is made to a primary portable unit 3 and primary mobile vehicular repeater unit 2. For practical purposes, the primary portable unit 3 and primary mobile vehicular repeater unit 2 belong to the same user where the primary mobile vehicular repeater unit 2 is installed in the user's vehicle and the primary portable unit 3 is carried by the same user. An alternative mobile vehicular repeater unit 8 and alternative portable unit 9 are used to represent other mobile vehicular repeater units and portable units that are part of the same wireless communications system as the primary mobile and portable units 2, 3.

In a first scenario, the base station 1 will adequately illuminate the area in which the primary portable unit 3 is located. Accordingly, the primary portable unit 3 establishes and maintains communication with the base station 1 and there is no need for the primary mobile vehicular repeater unit 2 to perform vehicular repeater functions. In a second scenario, the primary portable unit 3 is located in an area shadowed from the base station 1, but already illuminated by the alternative mobile vehicular repeater unit 8. As such, the primary portable unit 3 establishes and maintains communication with the base station 1 as relayed to it by the alternative mobile vehicular repeater unit 8. In a third scenario, the primary portable unit 3 is in an area shadowed by the base station 1 and not illuminated by the alternative mobile vehicular repeater unit 8. Accordingly, the primary portable unit 3 directs the primary mobile vehicular repeater unit 2 to initiate functions as a vehicular repeater, i.e. switch from the mobile radio mode of operation to the extended coverage mode of operation, and thereafter establishes and maintains communication with the base station 1 through the primary mobile vehicular repeater unit 2 acting as the vehicular repeater.

In accordance with an especially preferred embodiment of the present invention, a Reservation Slotted Time Division Multiple Access (TDMA) protocol is employed, for transmission of both voice and data, between the base stabon(s), mobile vehicular repeater unit(s) and portable units comprising a given communication network. Very short (10 ms duration) channel access request messages with slotted contention are used to request access to the reverse channel. The subsequent reservation grant information is provided over the forward channel in a control block. The requesting portable unit then has reserved access to one of the times slots on the reverse channel, and can be confident that it will not collide with other mobiles. While the very short channel access request messages consume a small portion of the reverse channel bandwidth (typically less than one percent), the protocol attribute of eliminating collisions between longer messages provides a typical channel throughput of 85%, even under very heavy loading conditions where, for example, a Digital Sense Multiple Access (DSMA) protocol would be incapacitated. Through this mechanism, it has been possible to provide an increase in channel capacity of more than four times the prior industry standard 4800 bps DSMA protocols.

Figure 7:
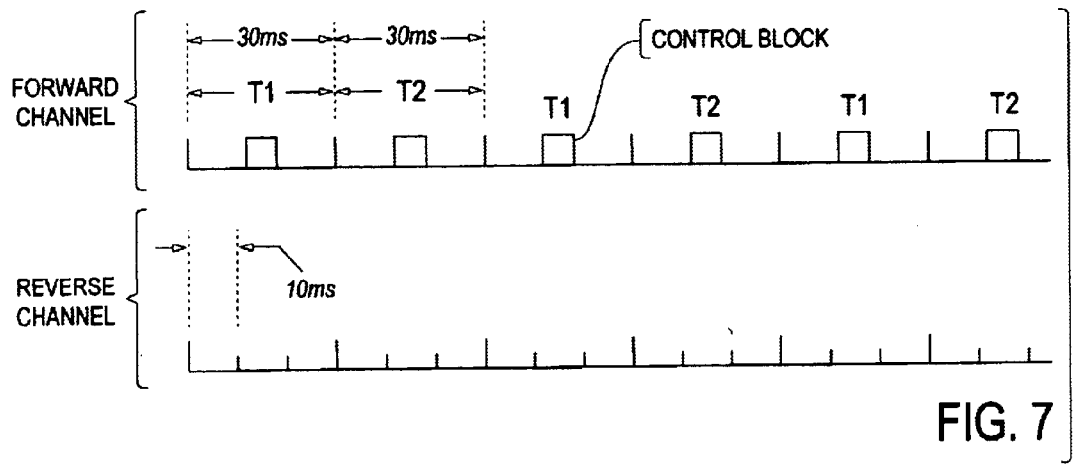
FIG. 7 shows the forward and reverse channels divided into an illustrative two alternating time slots, each of 30 ms duration, to accommodate exchange of voice and data transmissions between the base station, mobile vehicular repeater units and portable units of a communication system constructed in accordance with the present invention.

Since voice messages are essentially a circuit switched phenomenon, requiring guaranteed channel bandwidth, the channel contention sequence employed in accordance with a novel aspect of the present invention provides an efficient integration of both packet switch and circuit switch messaging on the same radio channel. This is particularly important for long data messages such as file transfers, which are more suited to circuit switching than packet switching and benefit greatly from the reservation protocol and absence of radio channel collisions. Additionally, message retransmissions are essentially eliminated, improving radio channel capacity and greatly reducing the length of time required to send a message, With reference now to FIG. 7, it will be seen that the forward and reverse channels are divided into two alternating time slots, T1 and T2, each of 30 ms duration. If a reverse channel timeslot is not reserved it is considered to be divided into three channel access request sub slots of 10 ms each, and is available to be used by mobile vehicular repeater units requesting access. A mobile vehicular repeater unit is permitted to place a channel access request on one of the three available subslots in a timeslot, identifying the requesting mobile with a short mobile access ID. The base station may receive up to three valid channel access requests during a time slot, and acknowledges receipt of each through the use of a three bit field in the control block of the subsequent forward channel time slot. Channel access requests are queued by the base station, and time slot reservations granted by specifying the mobile access ID of the successful mobile in the control block of the forward channel time slot immediately preceding the reserved reverse channel time slot. A specific mobile vehicular repeater unit can be granted only one of the two alternating time slots T1 and T2, i.e., a channel bandwidth of 9600 bps represented by every second time slot on the reverse channel. Two mobile vehicular repeater units can then use the channel simultaneously for voice and data.

Figure 8:
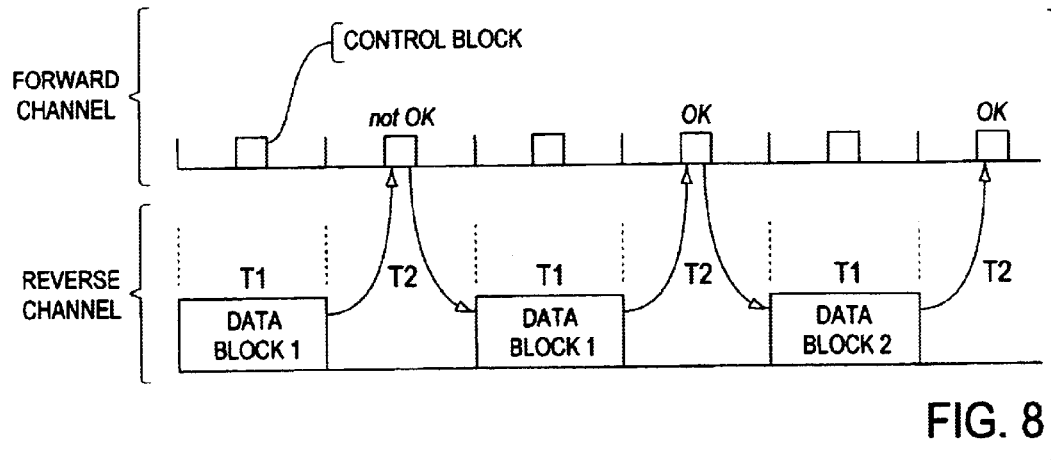
FIG. 8 is a graphical representation exemplifying data block transmission on the forward and reverse channels.

In FIG. 8 there is shown a mobile vehicular repeater unit transmitting a series of data blocks on the reverse channel. Each data block is encoded using a suitable forward error correction and detection algorithm and contains 45 six bit symbols of information, and with framing is 30 ms in duration. When a mobile vehicular repeater unit has been granted a reserved time slot by the base station, it transmits the first data block of its message in the specified time slot. It then switches to receive mode and receives the forward channel control block from the next time slot. Within the control block is a decode status indicator, specifying whether the reverse channel data block was received and fully corrected without residual errors by the base station. As seen in FIG. 8, in data block 1 the decode status is negative such that the mobile vehicular repeater unit is required to retransmit the data block during the next time slot. The subsequent decode status is positive, and the mobile vehicular repeater unit transmits the following data block, data block 2, during the subsequent time slot.

Retransmissions are handled on a data block by data block basis, and only the bad data blocks are retransmitted. If, for example, at the edge of coverage the probability of transmitting an uncorrectable data block to the base station is 10%, then a data message 100 data blocks long will require that the mobile vehicular repeater unit actually transmit 110 blocks and will take about 10% longer to transmit than the same message in a good coverage area. In contrast, with conventional data protocols, where the mobile transmits a data message and waits up to two seconds for an acknowledgement, then in the absence of an acknowledgement (indicating the message had errors) retransmits the entire message. Depending upon the quality of the radio channel, a message could be retransmitted up to five times, consuming large amounts of channel bandwidth, without any of the message transmissions being correctable by the base station.

Having now described an underlying exemplary transmission protocol which may be advantageously employed in a communication network constructed in accordance with the present invention, an exemplary scheme for causing the vehicular repeater unit to transition from the aforementioned mobile radio mode to the extended coverage mode will now be described, with particular reference to FIG. 9. As indicated earlier, in accordance with the extended coverage mode of the present invention a mobile vehicular repeater unit having no portable units already in active communication with it must be "awakened" before it will seek to provide such coverage to the requesting portable unit. To this end, the mobile vehicular repeater unit is configured to announce, on a periodic basis, its availability on a fixed beacon frequency. By way of illustrative example, this beacon frequency may be provisioned on a region wide (state, county, etc.) basis and stored in memory in both the mobile vehicular repeater unit and all portable units. Thus, as seen in FIG. 9, the mobile vehicular repeater unit transmits on the forward channel of this beacon frequency (i.e., PFC) a synchronization pattern in which fixed length synchronization blocks (30, 32, 34) are separated by non transmit intervals of random duration Indicated generally by blocks 31, 33, and 35.

Figure 9:
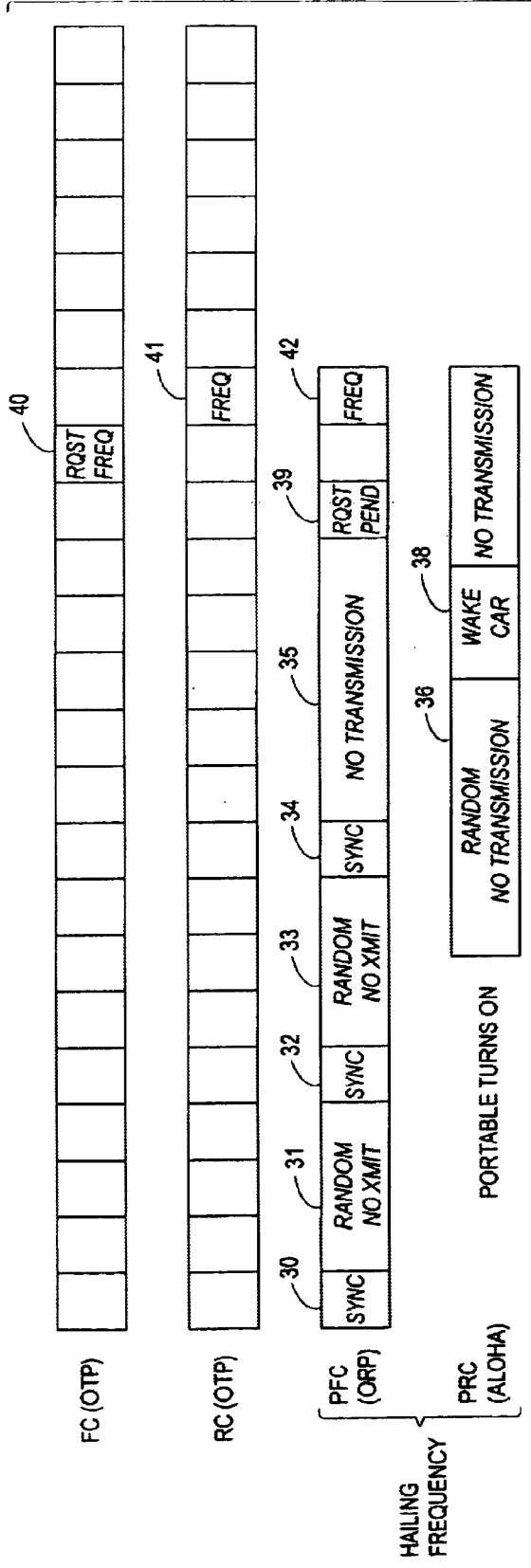
FIG. 9 depicts a packet based protocol for implementing a mobile vehicular repeater unit wakeup sequence during which, according to the present invention, a first portable unit transmits a request to a vehicular repeater unit configured to be operable in the extended coverage mode, and subsequently receives instruction from the now "awakened" vehicular repeater unit as to which set of frequency channels to use in a given region.

With continued reference to FIG. 9, it will be seen that when a portable unit is activated and is unable to establish a link to a base station in accordance with its frequency plan, after a non-transmit interval of random duration indicated generally at 36, a "wakeup" channel access request 38 is transmitted on the portable reverse channel (PRC) of the beacon frequency. Delaying transmission of an activated portable unit's wakeup channel access request by a random interval beyond the synchronization block is deemed to be advantageous and preferable because it minimizes collisions among multiple portables transmitting the same request The mobile vehicular repeater unit, now awakened by the first channel access request it receives, responds by transmitting on the portable forward channel (PFC) a "request pending" acknowledgment 39 to the portable unit and, if required, by transmitting a "frequency request" 40 to the base station on the reverse network channel (RC). Alternatively, the mobile vehicular repeater unit might be configured with a global positioning system (GPS) through which it would be adapted to ascertain the appropriate frequency channel pair to employ without transmission of a request to the base station.

In any event, once the mobile vehicular repeater unit either ascertains (via GPS) or receives the frequency channel information from the base station via block 41 transmitted on the forward network channel (FC), it transmits to the requesting portable unit a block 42 representative of the assigned frequency channel identification. Now awakened, it is not necessary for a vehicular repeater unit constructed in accordance with the present invention to repeat the same wake-up sequence for any subsequent portable units. Rather, the vehicular repeater unit is preferably configured to transmit block 42 at desired intervals over the portable forward channel PFC such that later portable dwelling long enough on the beacon frequency will receive the assigned frequency identification.

Figure 10:
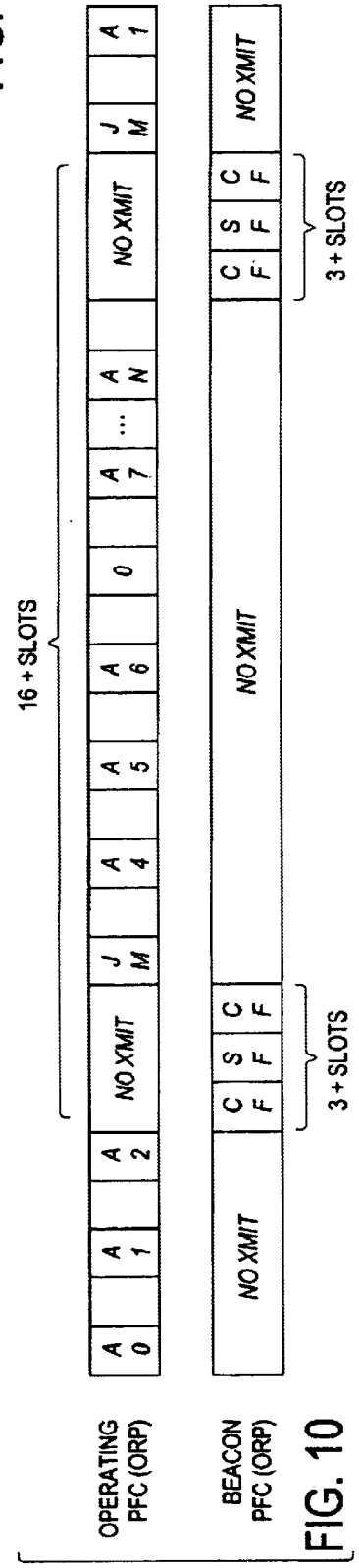
FIG. 10 depicts a packet based protocol for providing operating frequency information to subsequent portable units after the vehicular repeater unit has already entered the extended coverage mode.

An illustrative scheme is presented in FIG. 10. A vehicular repeater unit already in extended coverage mode after having been awakened by a first portable unit (as portable unit 3 of FIG. 3), transmits communication signals to the first portable unit at an operating frequency assigned in the earlier described manner. This portable forward channel is constituted by a series of time slots indicated generally at A0–AN. At a selected time interval $t_1$, say every 2 seconds, a time slot is reserved such that no signal is transmitted by the vehicular repeater unit on the assigned operating frequency. Instead, transmission at the operating frequency is suspended during a transition period spanning time slot CF, whereupon the synchronization pattern discussed in connection with FIG. 9 is transmitted at the beacon frequency during slot SF. As noted above, portable units having no coverage are configured, in accordance with the present invention, to dwell on the beacon frequency for a certain period of time, which is at least equal to $t_1$. Accordingly, any subsequent portable units requiring coverage will, after only a brief delay, receive a signal representative of the assigned operating frequency without attempting to duplicate the "wake-up" protocol. Any such subsequent portable units then switch to that assigned frequency. After a second transition period CF, the operation of the vehicular repeater unit reverts to transmission at the assigned portable forward channel operating frequency.

Although the present invention has been described with reference to certain illustrative embodiments, other embodiments are possible and will be readily apparent to those skilled in the art. Therefore, the spirit and scope of the appended claims should not be limited to the embodiments contained in this description.

What is claimed is:

1. A communication system comprising:
   a base station, mobile vehicular repeater unit and a portable unit,
   said base station transmitting to said mobile vehicular repeater unit over a first frequency channel portion, and said mobile vehicular repeater unit transmitting to said base station over a second frequency channel portion and said mobile vehicular repeater unit transmitting to said portable unit over the second frequency channel portion and said portable unit transmitting to said mobile vehicular repeater unit over the first frequency channel portion,
   wherein in an extended coverage mode of operation, said mobile vehicular repeater unit is responsive to an access request, transmitted by said portable unit, to transmit to said portable unit a signal representative of an identification of said first and second frequency channel portions,
   wherein said mobile vehicular repeater unit is further configured to periodically transmit an availability announcement signal on a beacon frequency prior to operating in said extended coverage mode of operation, a plurality of portable units in a predetermined geographic region being configured to monitor said beacon frequency prior to transmitting an access request and,
   wherein said availability announcement signal comprises a sequence of synchronization blocks, adjacent synchronization blocks being separated by a non-transmission interval of random duration.

2. A communication system as recited in claim 1, wherein said portable unit is a first portable unit, the system further comprising a second portable unit, and wherein said mobile vehicular repeater is operative, during said extended coverage mode of operation, to periodically transmit a frequency identification signal portion representative of an identification of said first and second frequency channel portions, whereby said second portable unit is operative to transmit to said mobile vehicular repeater unit over the first frequency channel upon receiving said frequency identification signal portion from said mobile vehicular repeater.

3. The communication system as recited in claim 1, wherein said access request is preceded by a non-transmission interval of random duration.

4. A method for communicating in a communication system, the communication system comprising at least one base station, a mobile vehicular repeater unit, and at least one portable unit, the method comprising the steps of:
   attempting to establish communication between a portable unit and any one of the at least one base stations, and if the attempt to establish communication between the primary portable unit and any one of the at least one base stations fails,
   initiating operation of the mobile vehicular repeater unit in an extended coverage mode of operation by transmitting an access request to the mobile vehicular repeater unit, the mobile vehicular repeater unit being responsive to said access request to transmit a signal portion representative of an identification of first and second frequency channel portions;
   establishing communication between the portable unit and the mobile vehicular repeater unit and between the mobile vehicular repeater unit and any one of the base stations by said portable transmitting over said first frequency channel portion and receiving over the second frequency channel portion and by said mobile vehicular repeater unit transmitting to said any one of the base stations over the second frequency channel portion and receiving from the base station over the first frequency channel portion;
   periodically transmitting from the mobile vehicular repeater unit an availability announcement signal on a beacon frequency prior to operating in said extended coverage mode of operation; and,
   monitoring said beacon frequency prior to transmitting an access request, wherein said availability announcement signal comprises a sequence of synchronization blocks, adjacent synchronization blocks being separated by a non-transmission interval of random duration.

* * * * *